(12) United States Patent
Kojima et al.

(10) Patent No.: US 8,033,607 B2
(45) Date of Patent: Oct. 11, 2011

(54) SEAT RECLINING DEVICE FOR VEHICLE

(75) Inventors: Yasuhiro Kojima, West Bloomfield, MI (US); Hideo Nihonmatsu, Anjo (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 13/054,267

(22) PCT Filed: Jun. 30, 2009

(86) PCT No.: PCT/JP2009/062000
§ 371 (c)(1),
(2), (4) Date: Jan. 14, 2011

(87) PCT Pub. No.: WO2010/007885
PCT Pub. Date: Jan. 21, 2010

(65) Prior Publication Data
US 2011/0109142 A1 May 12, 2011

(30) Foreign Application Priority Data

Jul. 16, 2008 (JP) ................................ 2008-185000

(51) Int. Cl.
*B60N 2/00* (2006.01)
(52) U.S. Cl. ................ 297/367 P; 297/341; 297/378.12
(58) Field of Classification Search .............. 297/341, 297/367 R, 367 L, 367 P, 378.12
See application file for complete search history.

(56) References Cited

U.S. PATENT DOCUMENTS

| | | | |
|---|---|---|---|
| 4,660,886 A * | 4/1987 | Terada et al. ............ | 297/367 R |
| 5,590,931 A * | 1/1997 | Fourrey et al. ............ | 297/366 |
| 5,611,599 A * | 3/1997 | Baloche et al. ........... | 297/367 R |
| 2003/0080600 A1* | 5/2003 | Eppert ......................... | 297/367 |
| 2005/0082892 A1* | 4/2005 | Yamada et al. ............ | 297/367 |

(Continued)

FOREIGN PATENT DOCUMENTS

JP 05237016 A * 9/1993

(Continued)

OTHER PUBLICATIONS

International Search Report Issued Aug. 25, 2009 in PCT/JP09/062000 filed Jun. 30, 2009.

(Continued)

*Primary Examiner* — David Dunn
*Assistant Examiner* — David E Allred
(74) *Attorney, Agent, or Firm* — Oblon, Spivak, McClelland, Maier & Neustadt, L.L.P.

(57) ABSTRACT

A seat reclining device for a vehicle is disclosed that includes a lock mechanism and a memory mechanism. The seat reclining device is arranged between a seat cushion frame and a seat back frame, and includes a control shaft associated with operation of an unlock operation lever. The lock mechanism includes a rotating body, which is secured to the seat back frame and is supported to be freely rotatable with respect to the base body. The memory mechanism includes a plate portion having an engaging portion, a holding bracket, which is freely rotatable about a rotational axis that is the same as the control shaft, a memory pole, a restricting portion, which restores the holding bracket to a predetermined initial position, a lever member, which is rotated in accordance with operation of the memory operation lever, and an engagement holding portion, which disengages the memory pole from the plate portion as the holding bracket is restored to the initial position.

9 Claims, 7 Drawing Sheets

U.S. PATENT DOCUMENTS

| | | | |
|---|---|---|---|
| 2007/0040437 A1* | 2/2007 | Nagura et al. | 297/367 |
| 2007/0102982 A1* | 5/2007 | Yamada et al. | 297/367 |
| 2008/0231103 A1* | 9/2008 | Rohee | 297/354.1 |
| 2011/0115272 A1* | 5/2011 | Kojima et al. | 297/367 R |

FOREIGN PATENT DOCUMENTS

| | | | |
|---|---|---|---|
| JP | 2002 209661 | | 7/2002 |
| JP | 2006006712 A | * | 1/2006 |
| JP | 2006 271581 | | 10/2006 |
| JP | 2010022471 A | * | 2/2010 |
| JP | 2010022472 A | * | 2/2010 |
| WO | WO 2010007886 A1 | * | 1/2010 |

OTHER PUBLICATIONS

U.S. Appl. No. 13/003,000, filed Jan. 7, 2011, Kojima, et al.
International Preliminary Report on Patentability and Written Opinion issued Feb. 8. 2011, in PCT/JP2009/062000.

* cited by examiner

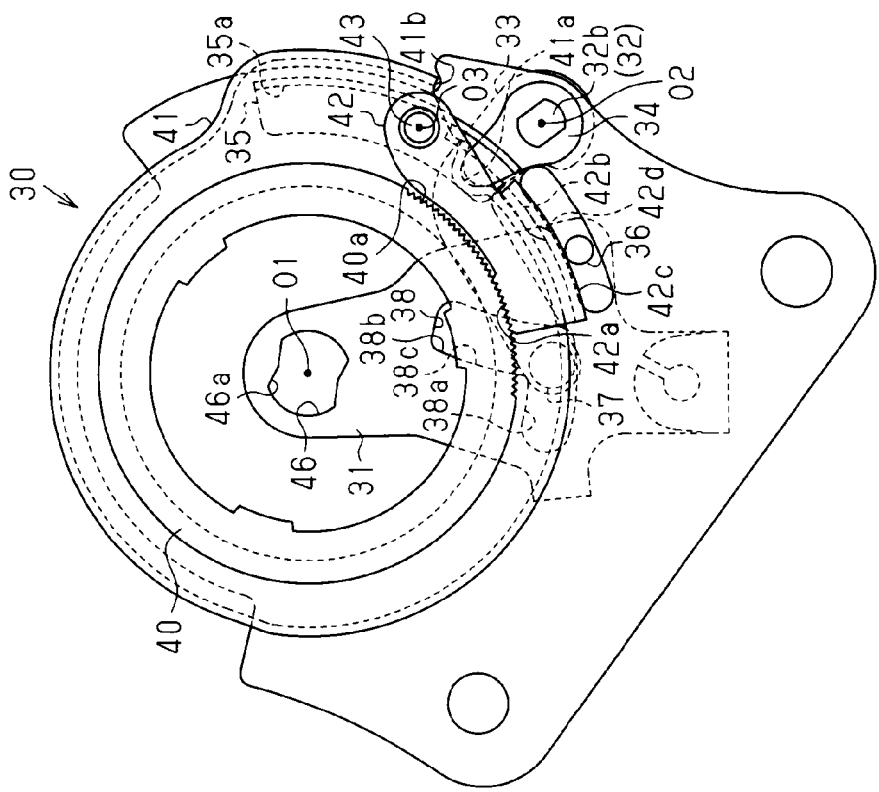
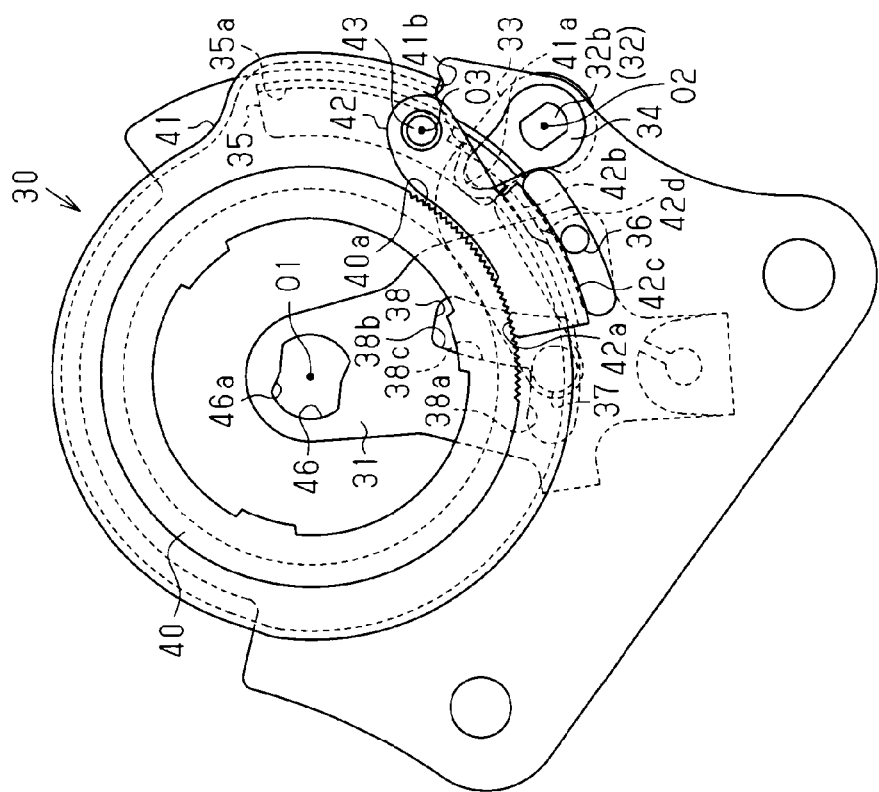

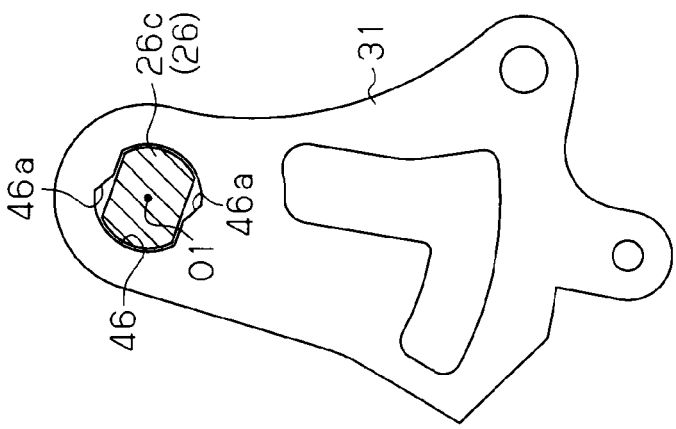
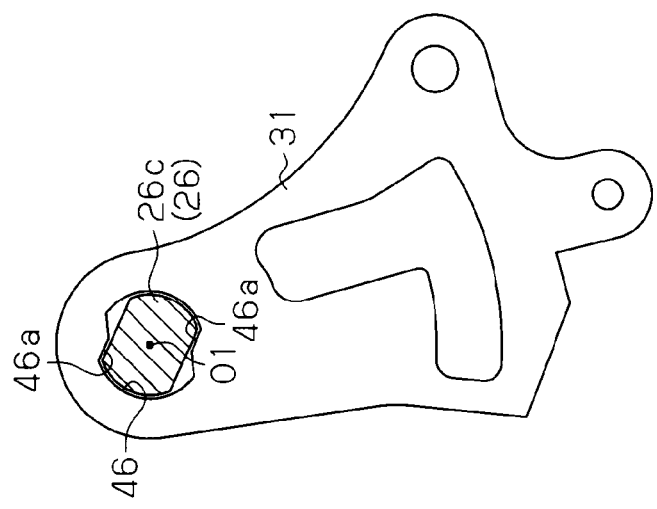
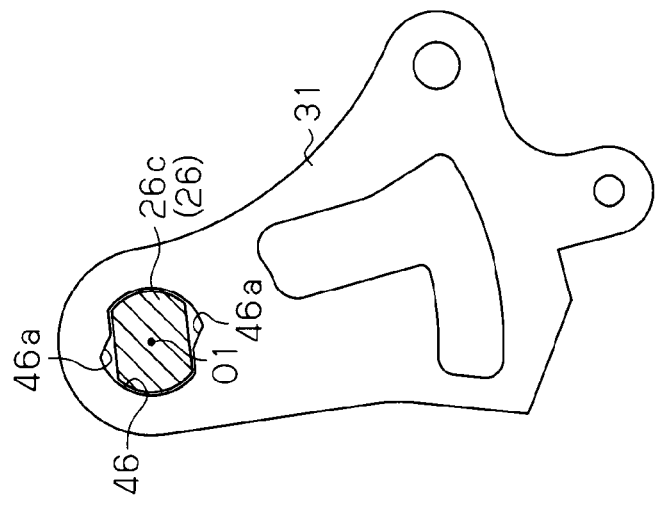

SEAT RECLINING DEVICE FOR VEHICLE

FIELD OF THE INVENTION

The present invention relates to a seat reclining device for a vehicle that includes a memory mechanism, which restores a seat back to an angular position at which the seat back was located immediately before being inclined forward with respect to a seat cushion.

BACKGROUND OF THE INVENTION

A seat reclining device for a vehicle disclosed in, for example, Japanese Laid-Open Patent Publication No. 2006-271581 has been proposed. The seat reclining device includes a first cable, which is coupled to a memory operation lever, a lock mechanism, a lever member, which is coaxial with the lock mechanism, a second cable, which is coupled to the lever member, a memory gear, which is mounted on a seat back frame, and a sector gear, which is coaxial with the lock mechanism. When the memory operation lever is operated and the first cable is pulled, the lever member is rotated and the second cable is pulled, thereby causing the memory gear to mesh with the sector gear. The sector gear is detachably held with respect to the seat cushion frame by friction of a plate spring secured to the seat cushion frame. The plate spring restricts rotation of the sector gear from an initial position in one direction (corresponding to the direction in which the seat back frame is inclined rearward).

When the lock mechanism is unlocked after the memory gear meshes with the sector gear, the memory gear and the sector gear rotate integrally. A predetermined delay clearance is provided between an engagement pin that is in an initial state and an interlock lever such that the memory gear and the sector gear mesh with each other before unlocking the lock mechanism.

When the sector gear is rotated, the pin that is engaged with the sector gear is disengaged, and a holding link on which the pin is integrally formed keeps the mesh between the memory gear and the sector gear, and the unlocked state of the lock mechanism.

When the seat back frame is inclined rearward and returned to the original position, the sector gear returns to the initial position with the memory gear, and the memory gear and the sector gear move out of the mesh. The seat back is then restored to the angular position at which the seat back was held immediately before being inclined forward.

[Prior Art Documents]
Patent Document
Patent Document 1: Japanese Laid-Open Patent Publication No. 2006-271581

SUMMARY OF THE INVENTION

Problems that the Invention is to Solve

In Japanese Laid-Open Patent Publication No. 2006-271581, the memory gear is mounted on the seat back frame. Thus, the components of the memory mechanism need to be separately mounted on the seat cushion frame and the seat back frame. Furthermore, since the memory gear is mounted on the seat back frame, a wire needs to be used to interlock the motion for meshing the memory gear with the sector gear with the following motion for unlocking the lock mechanism. As a result, arrangement space necessary in the seat back portion (seat back) is increased, and the assembling procedure is complicated.

Accordingly, it is an objective of the present invention to provide a seat reclining device for a vehicle that uses a general-purpose lock mechanism and is easy to assemble.

Means for Solving the Problems

To achieve the above objective, and in accordance with one aspect of the present invention, a seat reclining device for a vehicle is provided that includes a lock mechanism and a memory mechanism. The lock mechanism is arranged between a seat cushion frame and a seat back frame. The lock mechanism is selectively shifted between a locked state, in which the inclination of the seat back frame with respect to the seat cushion frame is restricted, and an unlocked state, in which the inclination is permitted, by rotation of a control shaft in accordance with operation of an unlock operation lever. The lock mechanism includes a base body, which is secured to the seat cushion frame, and a rotating body, which is secured to the seat back frame and is supported to be freely rotatable with respect to the base body. In the lock mechanism, the control shaft and the rotating body are rotated about the same rotational axis. When a memory operation lever is operated, the memory mechanism stores the angular position of the seat back frame with respect to the seat cushion frame in the state in which the lock mechanism is in the locked state. The memory mechanism shifts the lock mechanism to the unlocked state so as to permit the seat back frame to be inclined to a predetermined inclination position.

The memory mechanism includes a plate portion, a holding bracket, a memory pawl, a restricting portion, a lever member, and an engagement holding portion. The plate portion is located on the rotating body. The plate portion includes an engaging portion. The holding bracket is arranged closer to the seat cushion frame than a coupling surface between the seat back frame and the rotating body in a seat widthwise direction. The holding bracket is freely rotatable about the rotational axis that is the same as that of the control shaft. The memory pawl is coupled to the holding bracket to be freely rotatable. The memory pawl is selectively engaged with the engaging portion of the plate portion while receiving a prevention force preventing the engagement with the engaging portion. The restricting portion restores the holding bracket to a predetermined initial position by restricting the holding bracket from rotating in a reverse direction to the direction in which the seat back frame is inclined to the predetermined inclination position. The lever member engages the memory pawl with the plate portion against the prevention force applied to the memory pawl or by cancelling the prevention force. The lever member is rotated in accordance with operation of the memory operation lever such that, as the control shaft is rotated in conjunction with the lever member, the lock mechanism is shifted to the unlocked state, and that the unlocked state is maintained. When the holding bracket is rotated to incline the seat back frame to the predetermined inclination position, the engagement holding portion maintains the engagement between the memory pawl and the plate portion. The engagement holding portion selectively disengages the memory pawl from the plate portion as the holding bracket is restored to the initial position.

According to this, the plate portion forming the memory mechanism is provided on the rotating body of the lock mechanism, which rotates integrally with the seat back frame. Also, the memory pawl, which is selectively engaged with the plate portion, is arranged closer to the seat cushion frame than a coupling surface between the seat back frame and the rotating body in the seat widthwise direction. The memory pawl is coupled to the pawl holding bracket, which is freely rotatable about an axis that is coaxial with the control shaft. The memory pawl is engaged with the plate portion by rotation of the lever member. Thus, the memory mechanism is basically concentrated at the section closer to the seat cushion frame than the coupling surface in the manner in which the memory mechanism is arranged in the vicinity of the lock mechanism (the control shaft). Thus, the assembling operation is facilitated. That is, the memory mechanism is concentrated in the vicinity of the lock mechanism and unitized, thus facilitating the assembling operation. Although the lock mechanism (the control shaft) is linked with the memory mechanism (the lever member), a general-purpose product may be used.

The holding bracket is preferably supported by a step portion formed on the base body or the rotating body.

According to this, the pawl holding bracket is arranged using the thickness of the lock mechanism in the seat widthwise direction, thus inhibiting enlargement of the memory mechanism in the seat widthwise direction.

When the lever member is rotated in accordance with operation of the memory operation lever, the lever member preferably abuts against the memory pawl, thereby engaging the memory pawl with the plate portion against the prevention force applied to the memory pawl or by cancelling the prevention force. The memory pawl includes a first surface, a second surface, and a step. The radial distance between the first surface and the rotational axis of the control shaft is small. The radial distance between the second surface and the rotational axis of the control shaft is greater than that of the first surface. The step portion is arranged between the first surface and the second surface. The lever member includes an abutment portion, which selectively abuts against the first surface, the second surface, and the step portion. When the abutment portion moves from the first surface to the second surface or from the second surface to the first surface via the step portion in accordance with rotation of the lever member, the memory pawl is shifted between the state in which the memory pawl is engaged with the plate portion and the state in which the memory pawl is disengaged from the plate portion.

According to this, the engagement with and disengagement from the plate portion are shifted with a very simple structure of arranging the abutment portion of the lever member on the step in accordance with rotation of the lever member.

The lever member preferably includes a first extended portion and a second extended portion. The first extended portion extends along the circumferential direction about the rotational axis of the control shaft. The second extended portion extends continuously from the first extended portion toward the control shaft. The memory mechanism includes an arm member, which is rotatably coupled to the seat cushion frame. The arm member includes a guide portion, which is inserted in the first and second extended portions. The arm member permits rotation of the lever member when the guide portion is arranged in the first extended portion, and restricts rotation of the lever member when the guide portion enters the second extended portion.

According to this, when the guide portion enters the second extended portion from the first extended portion, the arm member restricts rotation of the lever member as well as rotation of the control shaft. Accordingly, the unlocked state of the lock mechanism is maintained.

The restricting portion preferably includes a cam member, which is coupled to the arm member to rotate integrally with the arm member. The cam member is selectively engaged with the holding bracket as the holding bracket is restored to the initial position. After the memory pawl is engaged with the plate portion, the arm member is rotated while moving the guide portion to the second extended portion so that the cam member is disengaged from the holding bracket.

According to this, shifting of the lock mechanism to the unlocked state is completed after the memory pawl is engaged with the plate portion. Also, after the memory pawl meshes with the plate portion, the cam member and the pawl holding bracket go out of engagement, thus permitting rotation of the pawl holding bracket. This inhibits erroneous operation of the memory mechanism.

The engagement holding portion is preferably provided on the seat cushion frame. The abutment portion of the lever member maintains the engagement between the memory pawl and the plate portion at the beginning of rotation of the holding bracket to the predetermined inclination position, and subsequently, the engagement holding portion maintains the engagement between the memory pawl and the plate portion.

According to this, by providing the engagement holding portion separately from the lever member, the engagement holding portion and the lever member may be arranged on the inner side and the outer side of the seat cushion frame, respectively. Thus, space is easily saved and the device is easily unitized.

The lever member preferably includes an interlock inhibiting portion, which inhibits the lever member from interlocking with the control shaft when the control shaft is rotated in accordance with operation of the unlock operation lever.

According to this, due to the interlock inhibiting means, the lever member does not interlock with rotation of the control shaft associated with operation of the unlock operation lever. Thus, the memory operation lever associated with operation of the lever member may be arranged on the side of the seat different from the unlock operation lever.

The control shaft preferably includes a first hinge on one end and a second hinge on the other end. The first hinge is coupled to the unlock operation lever. The second hinge is fitted to a fitting bore of the lever member. The interlock inhibiting portion is a clearance in the fitting bore set in the direction of rotation of the control shaft associated with operation of the unlock operation lever.

According to this, the necessity for a mechanism for providing a clearance in the control shaft is eliminated by employing the clearance of the fitting bore as the interlock inhibiting means. Thus, deterioration of performance of the lock mechanism such as displacement of the axis is prevented.

The second extended portion preferably includes a depression part, which is depressed by the guide portion in accordance with rotation of the arm member. The depression part is depressed by the guide portion such that the control shaft, which is interlocked with the lever member, is rotated to shift the lock mechanism to the unlocked state.

According to this, the depression part of the second extended portion is depressed by the guide portion in accordance with rotation of the arm member, and the control shaft interlocked with the lever member is further rotated in the direction to shift the lock mechanism to the unlocked state. Thus, the lock mechanism is further reliably shifted to the unlocked state without increasing the operation amount of the memory operation lever more than necessary.

BRIEF DESCRIPTION OF THE DRAWINGS

[FIG. 5] A diagram for explaining operation of the memory mechanism of FIG. 4.

[FIG. 6] A diagram for explaining operation of the memory mechanism of FIG. 4.

[FIGS. 11] (a), (b), and (c) are side views illustrating the lever member provided in the memory mechanism of FIG. 4.

DETAILED DESCRIPTON OF THE PREFERRED EMBODIMENTS

One embodiment of the present invention will now be described with reference to drawings.

Figure 10:
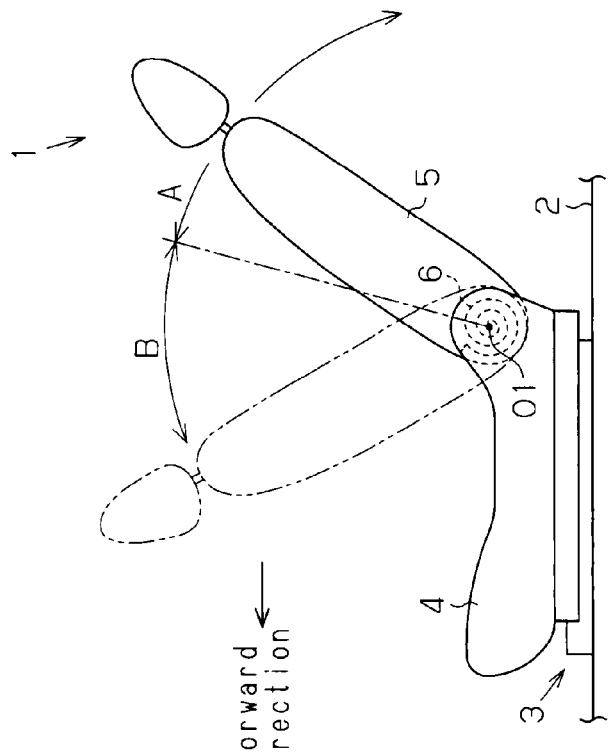
[FIG. 10] A side view illustrating a vehicle seat including the seat reclining device for a vehicle of FIG. 1.

FIG. 10 is a side view showing a vehicle seat 1 including a seat reclining device for a vehicle according to one embodiment of the present invention. As shown in FIG. 10, a pair of seat sliding mechanisms 3, which support the seat 1 to be slidable in the fore-and-aft direction of the vehicle, is located on a vehicle floor 2. The pair of seat sliding mechanisms 3 are arranged parallel to each other with a certain distance in the widthwise direction of the vehicle. The pair of seat sliding mechanisms 3 supports a seat cushion 4, which forms a seat surface for the seat 1. A seat back 5, which forms the backrest of the seat 1, is coupled to the rear end portion of the seat cushion 4 via a known pair of lock mechanisms 20 shown in FIG. 1. The seat back 5 is selectively inclined in the fore-and-aft direction of the vehicle.

The inclination angle of the seat back 5 with respect to the seat cushion 4 includes a seating range A, in which the seat back 5 is adjustable in multiple steps in a small angular range, and a forward inclination range B, in which the seat back 5 is fully inclined forward without steps. The forward inclination range B is forward of the vehicle to a greater degree than the seating range A. An urging member (such as a spiral spring) 6 is arranged around a rotational axis O1 of the seat back 5 with respect to the seat cushion 4. The urging member 6 assists forward inclination of the seat back 5 in the forward inclination range B. The rotational axis O1 extends along the widthwise direction of the vehicle seat 1.

Furthermore, each seat sliding mechanism 3 includes a known sliding lock mechanism, which selectively inhibits and permits its operation (sliding operation). The sliding lock mechanism is what is called a walk-in mechanism, and permits the operation of the seat sliding mechanism 3 to move the vehicle seat 1 forward of the vehicle in conjunction with forward inclination of the seat back 5.

Figure 1:
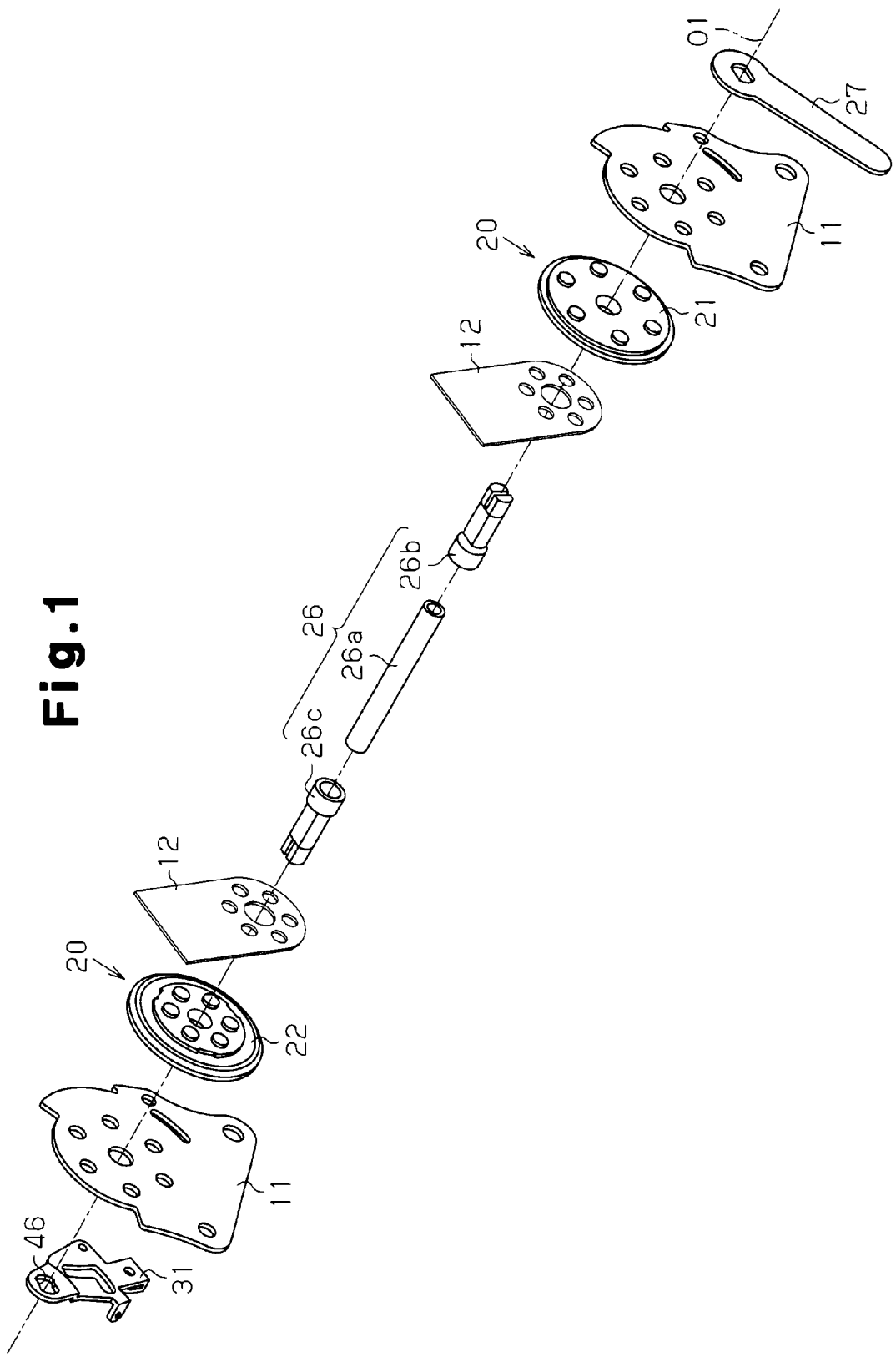
[FIG. 1] An exploded perspective view illustrating a seat reclining device for a vehicle according to one embodiment of the present invention.
Figure 2:
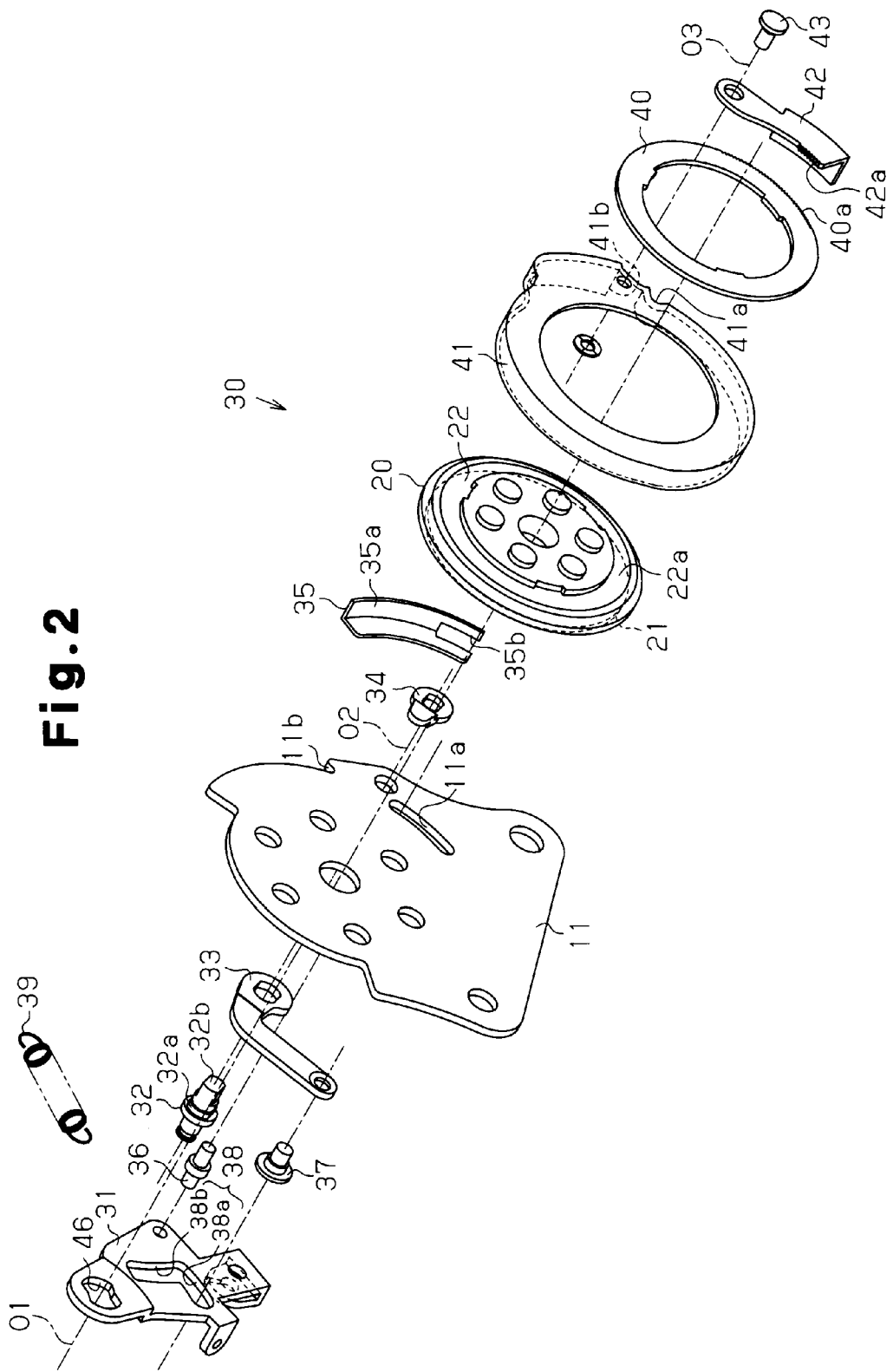
[FIG. 2] An exploded perspective view illustrating part of the seat reclining device of FIG. 1.

FIGS. 1 and 2 are exploded perspective views showing the seat reclining device for a vehicle according to the present embodiment. As shown in FIGS. 1 and 2, the seat reclining device includes a pair of seat cushion frames 11, which form the skeletal frame of the seat cushion 4. Seat back frames 12, which form the skeletal frame of the seat back 5, are each coupled to the corresponding seat cushion frame 11 via the associated lock mechanism 20 to be rotatable about the rotational axis O1. In FIG. 1, the upper left direction of the rotational axis O1 corresponds to the outward direction of the vehicle, and the lower right direction of the rotational axis O1 corresponds to the inward direction of the vehicle. The seat cushion frames 11 and the seat back frames 12 are formed by metal plates. Among the pair of lock mechanisms 20 each arranged between the corresponding seat cushion frame 11 and the seat back frame 12, the lock mechanism 20 arranged outward of the vehicle will hereafter be referred to as a first lock mechanism 20A, and the lock mechanism 20 arranged inward of the vehicle will hereafter be referred to as a second lock mechanism 20B. The lock mechanisms 20 are selectively shifted between a locked state, in which rotation (inclination) of the seat back frames 12 with respect to the seat cushion frames 11 is restricted, and an unlocked state, in which rotation is permitted.

Figure 3:
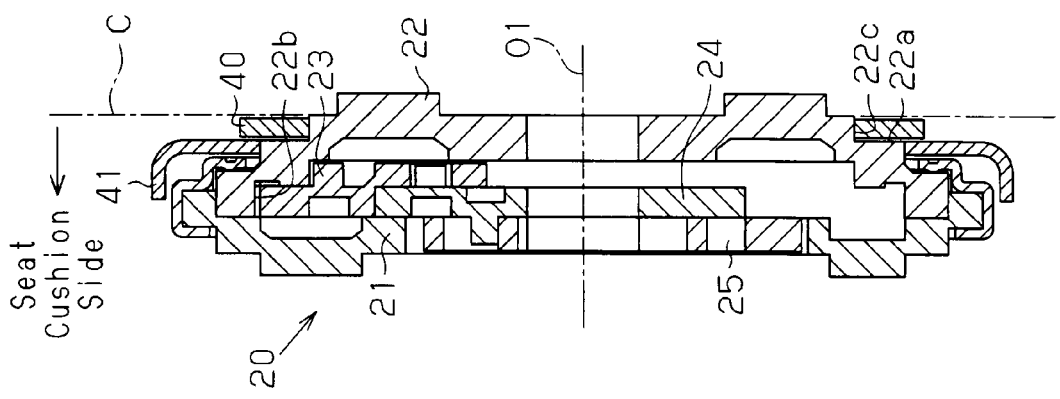
[FIG. 3] A cross-sectional view illustrating the lock mechanism provided in the seat reclining device of FIG. 1.

The structure of the first lock mechanism 20A will now be described. Since the structure of the second lock mechanism 20B is symmetrical with the first lock mechanism 20A, the description of the second lock mechanism 20B is omitted. As shown in FIG. 3, the first lock mechanism 20A includes a base body, which is an annular lower plate 21 in this embodiment, and a rotating body, which is an annular upper plate 22 in this embodiment. The annular lower plate 21 is welded to the inner surface of the seat cushion frame 11. The annular upper plate 22 is welded to the outer surface of the seat back frame 12. The upper plate 22 is supported to be freely rotatable with respect to the lower plate 21 about the rotational axis O1. A step portion 22c is formed on the inner surface of the upper plate 22, that is, on the surface facing to the seat back frame 12. This forms an annular mounting surface 22a. Also, an inner gear 22b is formed on the inner circumferential surface of the upper plate 22.

Pawls 23, which are attached to be movable in the radial direction about the rotational axis O1, and a cam 24, which moves the pawls 23 in the radial direction, are accommodated in an interior space formed between the lower plate 21 and the upper plate 22. The pawls 23 are arranged to selectively mesh with the inner gear 22b. The cam 24 is engaged with the pawls 23, and moves the pawls 23 in the radial direction as the cam 24 rotates with respect to the upper plate 22 about the rotational axis O1. That is, the pawls 23 move radially outward as the cam 24 is rotated with respect to the upper plate 22 in a first direction about the rotational axis O1. This moves the pawls 23 into mesh with the inner gear 22b, and the first lock mechanism 20A is thus shifted to the locked state. Alternatively, the pawls 23 move radially inward as the cam 24 is rotated with respect to the upper plate 22 in a second direction about the rotational axis O1. This moves the pawls 23 out of mesh with the inner gear 22b, and the first lock mechanism 20A is thus shifted to the unlocked state. Also, the first lock mechanism 20A includes a spring 25, which urges the cam 24 such that the pawls 23 move radially outward, that is, such that the first lock mechanism 20A is shifted to the locked state. The spring 25 is, for example, a spiral spring. The first lock mechanism 20A is generally held in the locked state since the pawls 23 are urged by the spring 25.

As shown in FIG. 1, a control shaft 26, which extends along the rotational axis O1 in the seat widthwise direction, includes a pipe-like main body portion 26a, a first hinge 26b, and a second hinge 26c. The first hinge 26b is firmly secured to the end of the main body portion 26a facing the inner side of the vehicle (lower right in FIG. 1) by welding, and extends through the corresponding seat cushion frame 11, the seat back frame 12, and the second lock mechanism 20B. The second hinge 26c is firmly secured to the end of the main body portion 26a facing the outer side of the vehicle (upper left in FIG. 1) by welding, and extends through the corresponding seat cushion frame 11, the seat back frame 12, and the first lock mechanism 20A. The hinges 26b, 26c are each coupled to the cam 24 of the corresponding lock mechanism 20 to rotate integrally with the cam 24 in a manner such as by fitting to the cam 24.

The distal end of the first hinge 26b projecting toward the inside of the vehicle from the seat cushion frame 11 is fitted to a fitting bore formed in the proximal end of an unlock operation lever 27 made by a metal plate and is firmly secured by welding. Thus, when the unlock operation lever 27 is manipulated so that the first hinge 26b (the control shaft 26) is rotated about the rotational axis O1, the cam 24 of the second lock mechanism 20B is rotated integrally with the first hinge 26b, thereby shifting the second lock mechanism 20B to the unlocked state. Simultaneously, when the second hinge 26c, which is integrated with the first hinge 26b via the main body portion 26a, is rotated about the rotational axis O1, the cam 24 of the first lock mechanism 20A is rotated integrally with the hinge 26c, thereby shifting the first lock mechanism 20A to the unlocked state. When operation of the unlock operation lever 27 is stopped, urging force of the spring 25 causes the cams 24 of the lock mechanisms 20 to rotate and restore together with the control shaft 26 and the unlock operation lever 27. This shifts (restores) the lock mechanisms 20 to the locked state.

The distal end of the second hinge 26c projecting toward the outside of the vehicle from the seat cushion frame 11 is loosely fitted to a fitting bore 46 formed at the proximal end of a lever member 31 formed by a metal plate. The lever member 31 is coupled to a non-illustrated memory operation lever via a wire, and is rotated about the rotational axis O1 in accordance with operation of the memory operation lever. Thus, when the second hinge 26c (the control shaft 26) is rotated about the rotational axis O1 via the lever member 31 in accordance with operation of the memory operation lever, the cam 24 of the first lock mechanism 20A is rotated integrally with the second hinge 26c so that the first lock mechanism 20A is shifted to the unlocked state. Simultaneously, as the first hinge 26b, which is integrated with the second hinge 26c via the main body portion 26a, is rotated about the rotational axis O1, the cam 24 of the second lock mechanism 20B is rotated integrally with the first hinge 26b so that the second lock mechanism 20B is shifted to the unlocked state.

A memory mechanism 30 including the lever member 31 will now be described with reference to FIGS. 2 and 4. A support pin 32 is supported at the lower right section of the seat cushion frame 11 in FIG. 4. As shown in FIG. 2, the support pin 32 extends along a rotational axis O2, which is parallel to the rotational axis O1. A first fitting portion 32a and a second fitting portion 32b having a smaller diameter than the first fitting portion 32a are sequentially formed on the distal end of the support pin 32 closer to the seat cushion frame 11. The fitting portions 32a, 32b are columnar and have a pair of flat surfaces, which are parallel to each other. An L-shaped arm member 33 is formed by a metal plate and is arranged on the outer side of the seat cushion frame 11, that is, on the side of the seat cushion frame 11 facing the lever member 31. The proximal end of the L-shaped arm member 33 is fitted to the first fitting portion 32a. A restricting portion, which is a teardrop-shaped cam member 34 in this embodiment, is formed by a metal plate and is arranged on the inner side of the seat cushion frame 11, that is, on the side facing the lock mechanism 20. The proximal end of the cam member 34 is fitted to the second fitting portion 32b. Thus, the arm member 33 and the cam member 34 are coupled to each other by the support pin 32 with the seat cushion frame 11 located in between. The arm member 33 and the cam member 34 rotate integrally with each other.

Also, an engagement holding portion, which is a holding member 35 in this embodiment, is firmly secured to the seat cushion frame 11 by welding. The holding member 35 extends arcuately along the circumferential direction about the rotational axis O1. The end of the holding member 35 oriented toward the clockwise direction in FIG. 4 is adjacent to the distal end of the cam member 34. The holding member 35 is formed by a metal plate, and has an L-shaped cross-section. The radially outer section of the holding member 35 includes a guide portion that is arcuate about the rotational axis O1. The guide portion projects inward of the vehicle, and the inner circumferential surface of the guide portion forms a guide surface 35a. A notch 35b is formed at the section of the holding member 35 adjacent to the cam member 34. The notch 35b of the holding member 35 permits the distal end of the cam member 34 to enter.

Figure 4:
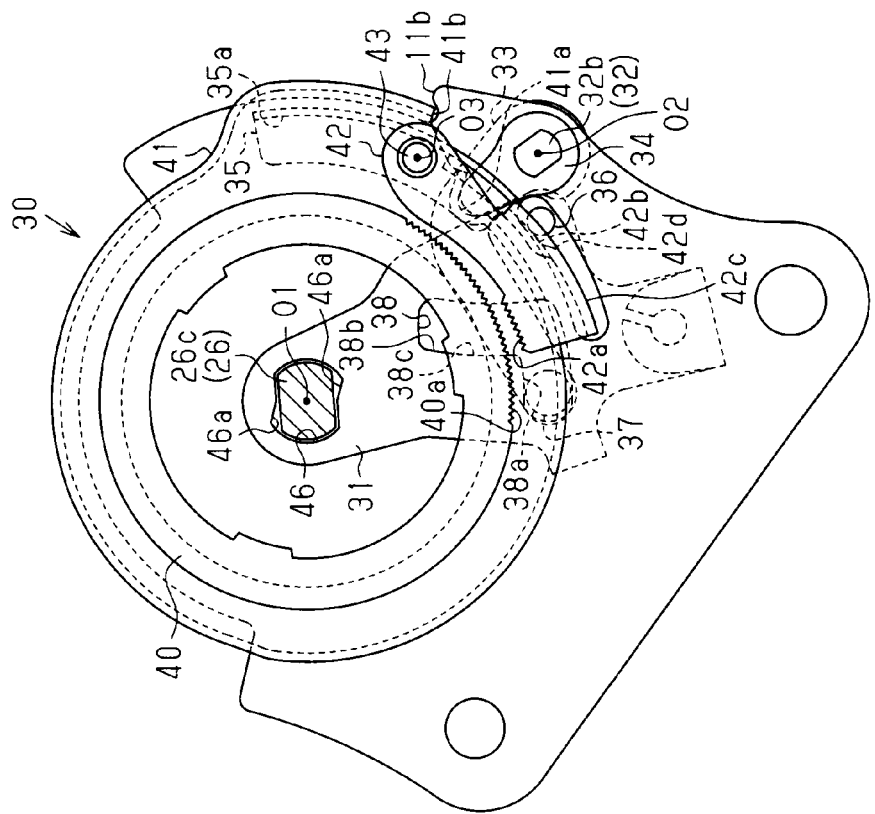
[FIG. 4] A side view illustrating the memory mechanism provided in the seat reclining device of FIG. 1.

Furthermore, a slot-like guide hole 11a is formed in the seat cushion frame 11 on the left side of the rotational axis O2 (the cam member 34) in FIG. 4. The guide hole 11a extends arcuately along the circumferential direction about the rotational axis O1. A guide pin 36 (a contact portion), which extends from the lever member 31, extends through the guide hole 11a. Thus, when the lever member 31 is rotated about the rotational axis O1, the guide pin 36 moves along the guide hole 11a in conjunction with the rotation.

A substantially columnar guide portion 37, which projects toward the lever member 31 and is parallel to the rotational axis O1, is secured to the distal end of the arm member 33. The lever member 31 has an L-shaped slot 38 in which the guide portion 37 is inserted. The slot 38 has a first extended portion, which is a first slot 38a in this embodiment, and a second extended portion, which is a second slot 38b in this embodiment. The first slot 38a extends along the circumferential direction about the rotational axis O1 (the control shaft 26). The second slot 38b extends toward the rotational axis O1 continuously from the first slot 38a. Thus, when the guide portion 37 is located in the first slot 38a, the guide portion 37 may be relatively moved along the first slot 38a (free movement), thus permitting the rotation of the lever member 31 about the rotational axis O1. When the guide portion 37 enters the second slot 38b from the first slot 38a, the rotation of the lever member 31 is restricted. Alternatively, when the guide portion 37 is located in the first slot 38a, the guide portion 37 is sandwiched between the inner circumferential surfaces of the first slot 38a. This restricts rotation of the arm member 33 about the rotational axis O2. When the guide portion 37 is located in the second slot 38b, rotation of the arm member 33 about the rotational axis O2 is permitted.

In the present embodiment, while the guide portion 37 relatively moves along the first slot 38a as the lever member 31 is rotated in the clockwise direction of FIG. 4, the rotation of the control shaft 26 interlocked with the lever member 31 causes the inner gear 22b to be disengaged from the outer teeth of the pawls 23, and thereby barely completes unlocking the lock mechanism 20. This is to minimize the operation amount (stroke) of the memory operation lever associated with rotation of the lever member 31 so that the operation load is reduced. In this state, rotation of the arm member 33 about the rotational axis O2 is restricted together with the cam member 34.

Also, the distance between the guide portion 37 and the rotational axis O2 in the state immediately after the guide portion 37 has entered the second slot 38b from the first slot 38a is set shorter than the distance between the end of the second slot 38b and the rotational axis O2. Thus, the guide portion 37 moves to the end of the second slot 38b after unlocking of the lock mechanism 20 is completed (after shifting to the unlocked state is completed). The guide portion 37 then presses the lever member 31 such that the lever member 31 further rotates in the clockwise direction of FIG. 4, that is, in the direction in which the lock mechanism 20 is shifted to the unlocked state. That is, the second slot 38b has a depression part 38c, which is depressed by the guide portion 37 such that the control shaft 26 interlocked with the lever member 31 is rotated to shift the lock mechanism 20 to the unlocked state. While the guide portion 37 relatively moves in the second slot 38b, the lever member 31 might slightly wobble about the rotational axis O1, but the lever member 31 is restricted from being rotated by an amount that shifts the lock mechanism 20 from the unlocked state to the locked state. The lever member 31 and the support pin 32 are coupled to each other via a coil spring 39. The coil spring 39 is urged in the direction in which the guide portion 37 relatively moves toward the end of the first slot 38a, that is, in the direction in which the guide portion 37 relatively moves toward the second slot 38b, that is, in the direction in which the lock mechanism 20 is shifted to the locked state.

A ring-like plate portion, which is a plate member 40 in this embodiment formed by a metal plate, is secured to the upper plate 22. The plate member 40 is joined to the mounting surface 22a. An engaging portion, which is a sawtooth wave-like meshing portion 40a, is formed on the outer circumferential portion of the plate member 40.

Also, an annular holding bracket 41 formed by a metal plate is provided to surround the lock mechanism 20. The annular holding bracket 41 is coaxial with the control shaft 26 (the rotational axis O1) and is freely rotatable. That is, the holding bracket 41 is supported by the step portion 22c, and is arranged closer to the seat cushion frame 11 than a coupling surface C (see FIG. 3) between the seat back frame 12 and the upper plate 22 in the seat widthwise direction. The outer diameter of most part of the holding bracket 41 is smaller than the inner diameter of the holding member 35 (the guide surface 35a). An engaging recess 41a, which is recessed radially inward at the lower right section in FIG. 2, is formed in the circumferential wall of the holding bracket 41. The distal end of the cam member 34, which passes through the notch 35b, is selectively fitted in the holding bracket 41. When rotation of the cam member 34 is restricted in the aforementioned manner, the distal end of the cam member 34 is fitted in the engaging recess 41a so that rotation of the holding bracket 41 is restricted. The angular position of the holding bracket 41 at this point is referred to as an initial position.

The circumferential wall of the holding bracket 41 bulges radially outward at a section from the engaging recess 41a extending in the counterclockwise direction in FIG. 4. The edge portion of the bulging section adjacent to the engaging recess 41a forms an engaging piece 41b. A restricting piece 11b is formed on the seat cushion frame 11. The restricting piece 11b projects to restrict rotation of the engaging piece 41b in the clockwise direction of FIG. 4. Thus, rotation of the holding bracket 41 in the clockwise direction of FIG. 4 is restricted by the engagement of the engaging piece 41b with the restricting piece 11b. The angular position of the holding bracket 41 at this point is the same as the initial position. That is, the cam member 34 and the restricting piece 11b operate together to restrict rotation of the holding bracket 41 in the clockwise direction of FIG. 4 at the initial position.

The proximal end of a memory pawl 42 made by a metal plate is coupled to the holding bracket 41. The memory pawl 42 freely rotates about a rotational axis O3 of a support pin 43 located in the vicinity of the engaging recess 41a. The rotational axis O3 is parallel to the rotational axis O1. The memory pawl 42 has a sawtooth wave-like meshing portion 42a. The meshing portion 42a is caused to selectively mesh with the meshing portion 40a of the plate member 40 by rotation of the memory pawl 42 about the rotational axis O3 in the clockwise direction of FIG. 4. Urging force (prevention force) that acts in the opposite direction to the direction in which the memory pawl 42 meshes with the plate member 40 (the counter-clockwise direction in FIG. 4) is applied to the memory pawl 42 by an appropriate urging member (for example, a spring).

A flange, which extends toward the seat cushion frame 11, is formed at the distal end of the memory pawl 42. When the outer surface of the flange abuts against the guide pin 36 or the holding member 35 (the guide surface 35a) in accordance with the rotational angular position of the holding bracket 41, the holding bracket 41 is restricted from being rotated in the counter-clockwise direction of FIG. 4 (see FIGS. 4 to 9). Also, the flange of the memory pawl 42 includes a first surface, which is a first arcuate portion 42b in this embodiment, and a second surface, which is a second arcuate portion 42c in this embodiment. The radial distance between the first arcuate portion 42b and the rotational axis O1 (the control shaft 26) is small. The radial distance between the second arcuate portion 42c and the rotational axis O1 is greater than that of the first arcuate portion 42b. The first and second arcuate portions 42b, 42c are connected via a step 42d. The first and second arcuate portions 42b, 42c are formed in an arcuate shape about the rotational axis O1 (the control shaft 26). In accordance with rotation of the lever member 31 in the clockwise direction of FIG. 4, the guide pin 36 moves from the first arcuate portion 42b to the second arcuate portion 42c via the step 42d. Accordingly, the memory pawl 42 is rotated in the clockwise direction of FIG. 4 about the rotational axis O3 to move toward the rotational axis O1 by an amount corresponding to the height of the step 42d. When the guide pin 36 is located at the second arcuate portion 42c, the meshing portion 42a of the memory pawl 42 meshes with the meshing portion 40a of the plate member 40. That is, the memory pawl 42 is shifted between the state in which the memory pawl 42 is engaged with the plate member 40 and the state in which the memory pawl 42 is disengaged from the plate member 40 by moving the guide pin 36 of the lever member 31 from the first arcuate portion 42b to the second arcuate portion 42c via the step 42d, or from the second arcuate portion 42c to the first arcuate portion 42b via the step 42d in accordance with rotation of the lever member 31.

Figure 8:
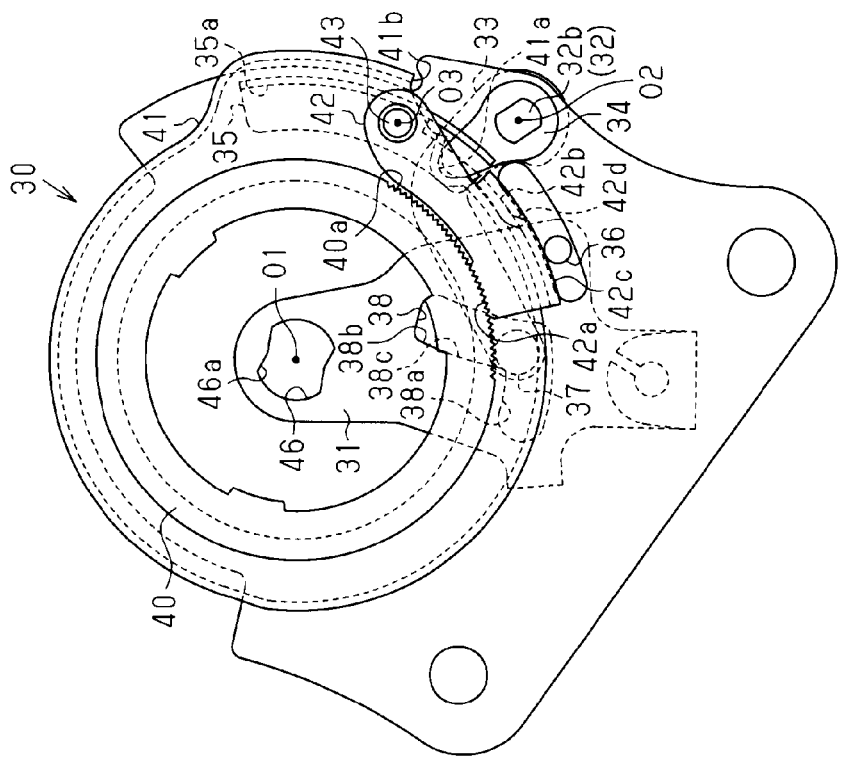
[FIG. 8] A diagram for explaining operation of the memory mechanism of FIG. 4.
Figure 9:
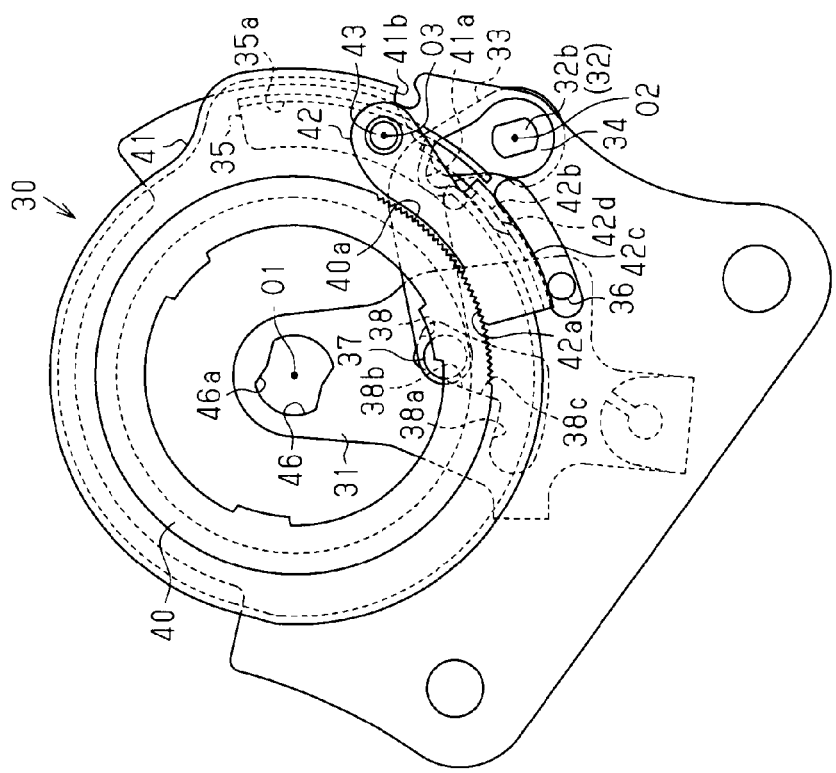
[FIG. 9] A diagram for explaining operation of the memory mechanism of FIG. 4.

Furthermore, the state in which the memory pawl 42 meshes with the plate member 40 is maintained by insertion of the flange of the memory pawl 42 in the holding member 35 as shown in FIGS. 8 and 9. Thus, for example, when the plate member 40 is rotated in the counter-clockwise direction of FIG. 4, that is, in the direction in which the seat back frame 12 is inclined forward, the memory pawl 42 that meshes with the plate member 40 is rotated integrally with the holding bracket 41. In this state, the cam member 34 is rotated in the clockwise direction of FIG. 4 integrally with the arm member 33 in the aforementioned manner so as to be disengaged from the holding bracket 41 (the engaging recess 41a). When the plate member 40 is rotated in the clockwise direction of FIG. 4, that is, in the direction in which the seat back frame 12 is inclined rearward, the memory pawl 42 that meshes with the plate member 40 is rotated integrally with the holding bracket 41. In this state, since the distal end of the cam member 34 is fitted in the engaging recess 41a, and the engaging piece 41b abuts against the restricting piece 11b, the holding bracket 41 is prevented from being further rotated. Accordingly, the holding bracket 41 is restored to the initial position.

The operation of the memory mechanism 30 will now be described. When the operational force is not applied to the memory operation lever, and the guide portion 37 is arranged at the first slot 38*a* of the lever member 31 as shown in FIG. 4, rotation of the arm member 33 and the cam member 34 about the rotational axis O2 is restricted. In this state, the distal end of the cam member 34 is fitted in the engaging recess 41*a*, and rotation of the holding bracket 41 about the rotational axis O1 is restricted.

In this state, when the lever member 31 is rotated in the clockwise direction of FIG. 4 in accordance with the operation of the memory operation lever, the hinge 26*c* (the control shaft 26) that is loosely fitted in the fitting bore 46 is rotated to shift the lock mechanism 20 to the unlocked state. At this point, since the guide portion 37 relatively moves in the first slot 38*a*, the rotation of the arm member 33 and the cam member 34 about the rotational axis O2 is kept restricted. Since rotation of the cam member 34 about the rotational axis O2 is restricted, rotation of the holding bracket 41 about the rotational axis O1 is also kept restricted. The guide pin 36 provided in the lever member 31 moves from the first arcuate portion 42*b* of the memory pawl 42 to the second arcuate portion 42*c* via the step 42*d* so as to press the memory pawl 42 to rotate about the rotational axis O3 in the clockwise direction of FIG. 4, and to mesh the memory pawl 42 with the plate member 40. Accordingly, the holding bracket 41 coupled to the memory pawl 42 is coupled to the plate member 40 (the seat back frame 12) to rotate integrally with the plate member 40. As shown in FIG. 5, when the guide portion 37 reaches the end of the first slot 38*a* closer to the second slot 38*b*, shifting of the lock mechanism 20 to the unlocked state is barely completed. Since the guide portion 37 has not entered the second slot 38*b* at this point, rotation of the arm member 33 about the rotational axis O2 and rotation of the holding bracket 41 about the rotational axis O1 are still kept restricted.

Figure 7:
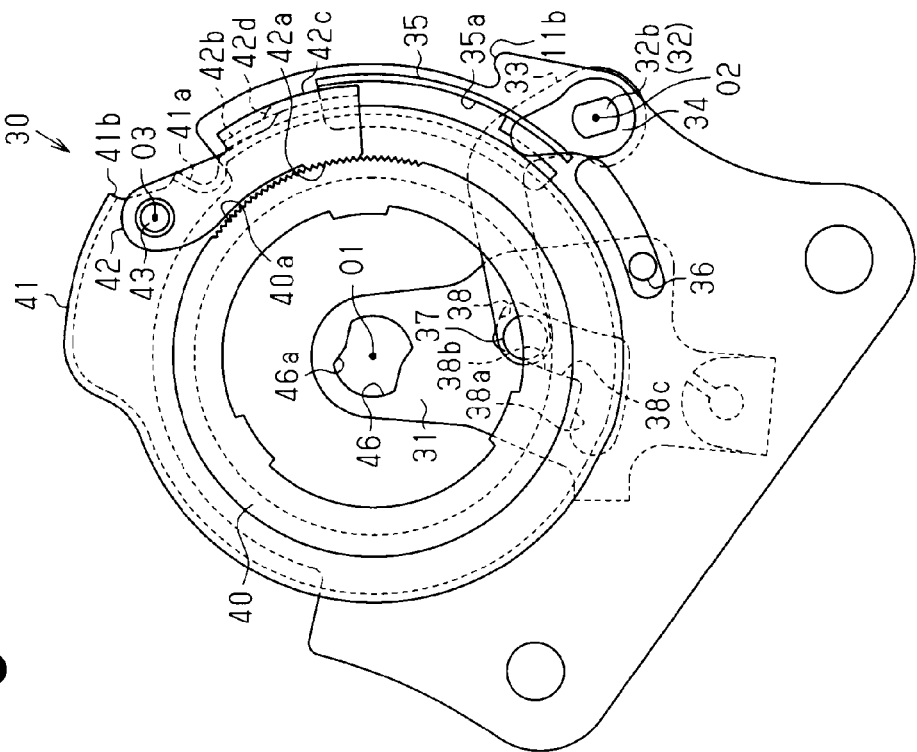
[FIG. 7] A diagram for explaining operation of the memory mechanism of FIG. 4.

Subsequently, when the lever member 31 is rotated in the clockwise direction of FIG. 5 and the guide portion 37 enters the second slot 38*b* as shown in FIG. 6, the restriction of rotation of the arm member 33 and the cam member 34 is cancelled. Thus, when the lever member 31 is further rotated in the clockwise direction of FIG. 6, the arm member 33 and the cam member 34 start to rotate about the rotational axis O2 in the clockwise direction as shown in FIG. 7. As a result, rotation of the holding bracket 41 is permitted. Simultaneously, the holding member 35 abuts against the flange of the memory pawl 42. Accordingly, the holding member 35 maintains the mesh between the memory pawl 42 and the plate member 40.

In this state, when the plate member 40 joined to the upper plate 22 is rotated in the counter-clockwise direction of FIG. 7 to fully incline the seat back 5 (the seat back frame 12) forward of the vehicle (forward inclination), the holding bracket 41 is rotated integrally with the memory pawl 42 meshing with the plate member 40 as shown in FIG. 8. At this point, the holding member 35 maintains the mesh of the memory pawl 42 with the plate member 40. Also, the cam member 34 is rotated in the clockwise direction of FIG. 8 while being disengaged from the holding bracket 41 (the engaging recess 41*a*), and the arm member 33, which is integrally rotated with the cam member 34, moves the guide portion 37 close to the end of the second slot 38*b*, that is, close to the fitting bore 46. At this point, the second slot 38*b* (the depression part 38*c*) is depressed by the guide portion 37, and the lever member 31 is further rotated in the clockwise direction of FIG. 8, that is, in the direction to shift the lock mechanism 20 to the unlocked state as described above. Thus, in accordance with the full inclination of the seat back 5 (the seat back frame 12), an extra operation amount of the lever member 31 for more reliably shifting the lock mechanism 20 to the unlocked state is ensured. The cam member 34 that is disengaged from the holding bracket 41 (the engaging recess 41*a*) is restricted from being rotated in the counter-clockwise direction of FIG. 8 by the circumferential wall of the holding bracket 41.

When the plate member 40 joined to the upper plate 22 is rotated in the clockwise direction of FIG. 8 to restore the angular position of the seat back 5 (the seat back frame 12) to the angular position immediately before the seat back 5 (the seat back frame 12) was fully inclined, the distal end of the cam member 34 starts to be fitted in the holding bracket 41 (the engaging recess 41*a*), which is rotated integrally in the manner described above, as shown in FIG. 9. The seat back 5 is then restored to the state shown in FIG. 4 in the reverse order of the aforementioned description. When the guide portion 37 enters the first slot 38*a*, the lever member 31, which is urged by the coil spring 39, rotates back such that the guide portion 37 relatively moves to the end of the first slot 38*a*.

The relationship between unlocking of the lock mechanism 20 based on operation of the unlock operation lever 27, and unlocking of the lock mechanism 20 based on operation of the memory operation lever (rotation of the lever member 31) will now be described.

As shown in FIGS. 11(*a*) to 11(*c*), the hinge 26*c* has a circular cross-section that includes a pair of parallel straight lines. The fitting bore 46 of the lever member 31 that is loosely fitted to the hinge 26*c* includes an interlock inhibiting portion extended in the circumferential direction, which is a pair of clearances 46*a* in this embodiment. The fitting bore 46 forms a butterfly configuration as a whole. That is, the cross-section of the fitting bore 46 differs from the cross-section of the hinge 26*c*. Thus, the hinge 26*c* (the control shaft 26) is permitted to rotate relative to the lever member 31 in a predetermined range in the fitting bore 46. The fitting bore 46 of the lever member 31, which is urged by the coil spring 39 to be in the initial state (corresponds to the state shown in FIG. 4), permits relative rotation of the hinge 26*c* by an amount corresponding to the clearances 46*a* in the rotation direction (the clockwise direction in FIG. 11(*a*)) of the hinge 26*c* (the control shaft 26) in accordance with operation of the unlock operation lever 27 as shown in FIG. 11(*a*). Thus, the lever member 31 does not rotate in conjunction with the operation of the unlock operation lever 27 (rotation of the control shaft 26) as shown in FIG. 11(*b*).

The inner wall forming the fitting bore 46 abuts against the hinge 26*c* in the rotation direction (the clockwise direction in FIG. 11(*a*)) of the lever member 31 associated with the operation of the memory operation lever. Thus, the hinge 26*c* (the control shaft 26) pressed by the inner wall of the fitting bore 46 immediately starts rotating in conjunction with the rotation of the lever member 31 associated with operation of the memory operation lever as shown in FIG. 11(*c*), and shifting of the lock mechanism 20 to the unlocked state is started.

The present embodiment provides the following advantages.

(1) The plate member 40 is secured to the upper plate 22 of the lock mechanism 20, which is rotated integrally with the seat back frame 12. Also, the memory pawl 42, which selectively meshes with the plate member 40, is coupled to the holding bracket 41, which is coaxial with the control shaft 26 and is rotated freely. In addition, the cam member 34 (and the restricting piece 11*b*), which restores the holding bracket 41 to the predetermined initial position, is provided on the seat cushion frame 11. Furthermore, the holding member 35, which maintains the mesh between the memory pawl 42 and the plate member 40, is provided on the seat cushion frame 11. Moreover, the axis of rotation of the lever member 31 that is associated with the mesh between the memory pawl 42 and the plate member 40 and the shifting of the lock mechanism 20 to the unlocked state is coaxial with the control shaft 26. The lever member 31 then abuts against the memory pawl 42 via the guide pin 36 so that the memory pawl 42 meshes with the plate member 40. Thus, the memory mechanism 30 is concentrated to the section closer to the seat cushion frame 11 than the coupling surface C in the seat widthwise direction basically by arranging the memory mechanism 30 in the vicinity of the lock mechanism 20 (the control shaft 26). That is, the memory mechanism 30 is concentrated in the vicinity of the lock mechanism 20 and is formed into a unit. This facilitates the operation for assembling the seat reclining device with the seat. Although the lock mechanism 20 (the control shaft 26) is linked with the memory mechanism 30 (the lever member 31), a general-purpose product may be used.

(2) The memory pawl 42 is caused to mesh with the plate member 40 by a very simple structure in which the abutment portion (the guide pin 36) of the lever member 31 is moved from the first arcuate portion 42b to the second arcuate portion 42c in accordance with rotation of the lever member 31.

(3) When the guide portion 37 enters the second slot 38b from the first slot 38a, the arm member 33 restricts rotation of both the lever member 31 and the control shaft 26. This maintains the unlocked state of the lock mechanism 20.

(4) Shifting of the lock mechanism 20 to the unlocked state is completed after the memory pawl 42 meshes with the plate member 40. Also, after the memory pawl 42 meshes with the plate member 40, the cam member 34 is disengaged from the holding bracket 41 (the engaging recess 41a), and rotation of the holding bracket 41 is permitted. Thus, erroneous operation of the memory mechanism 30 is prevented.

(5) The reclining device disclosed in, for example, Japanese Laid-Open Patent Publication No. 2002-209661 includes an unlock operation lever (first operation lever), which is associated with shifting of the lock mechanism between the locked state and the unlocked state, and a memory operation lever (second operation lever), which is associated with shifting of the memory operation. During operation of the memory operation lever, the memory operation lever operates with the unlock operation lever. Thus, the memory operation lever needs to be arranged on the same side of the seat as the unlock operation lever. This deteriorates operability. Also, the flexibility of the arrangement of the memory operation lever is reduced, and space necessary for arranging the memory operation lever and the unlock operation lever is increased. In contrast, in the present embodiment, the lever member 31 is not interlocked with rotation of the control shaft 26 associated with operation of the unlock operation lever 27 due to the clearances 46a of the fitting bore 46. Thus, the memory operation lever associated with the operation of the lever member 31 may be arranged on the side of the seat opposite to the unlock operation lever 27, which improves operability. Also, the flexibility of the arrangement of, for example, the operation levers is improved.

(6) The reclining device disclosed in, for example, Japanese Laid-Open Patent Publication No. 11-70027 includes a normal unlock operation lever, which is associated with shifting of the lock mechanism between the locked state and the unlocked state, and a memory operation lever, which is associated with shifting of the memory operation. Providing clearances in the rod connecting the lock mechanisms arranged on both sides of the seat permits varying the operation angle of the unlock operation lever and the memory operation lever, which are arranged on the opposite sides of the seat. In this case, a mechanism is necessary for providing clearances in the rod that connects the lock mechanisms arranged on both sides of the seat, and the shaft becomes unstable, which may deteriorate the performance of the lock mechanisms. Also, space for arranging the mechanism for providing the clearances is necessary, and the number of components is increased. In contrast, in the present embodiment, the mechanism for providing the clearances does not need to be provided in the control shaft by employing the clearances 46a of the fitting bore 46. Thus, deterioration of performance of the lock mechanism such as displacement of the axis is prevented.

(7) In the present embodiment, the guide portion 37 presses the depression part 38c of the second slot 38b in accordance with rotation of the arm member 33, and the control shaft 26 interlocked with the lever member 31 is further rotated in the direction to shift the lock mechanism 20 to the unlocked state. Thus, the lock mechanism 20 is further reliably shifted to the unlocked state without increasing the operation amount of the memory operation lever more than necessary. In particular, when the guide portion 37 moves toward the end of the second slot 38b, the urging member 6 assists forward inclination of the seat back 5. Thus, the lever member 31 is easily rotated and operational force required for operating the memory operation lever is reduced.

(8) In the reclining device disclosed in, for example, Japanese Laid-Open Patent Publication No. 2006-304832, the strength is of course necessary in the lock mechanism, and the equivalent strength is necessary in the memory mechanism. This is because the lock mechanism and the memory mechanism operate integrally during the normal reclining operation (during memory cancellation), and only the lock mechanism operates during the walk-in operation (during memory operation). When restoring the lock mechanism, the position where the lock mechanism integrates with the memory mechanism that did not operate is referred to as a memory position. In contrast, in the present embodiment, only the lock mechanism 20 is operated during the normal reclining operation (during memory cancellation), and the lock mechanism 20 and the memory mechanism 30 operate integrally during the walk-in operation (during memory operation). The position where the lock mechanism 20 and the memory mechanism 30 are integrated is referred to as a memory position. Thus, the memory mechanism 30 may basically have a strength that is sufficient to be engaged with the lock mechanism 20.

(9) The holding bracket 41 is supported by the step portion 22c of the upper bracket 22. Thus, the holding bracket 41 is arranged using the thickness of the lock mechanism 20 in the seat widthwise direction. This inhibits enlargement of the memory mechanism 30 in the seat widthwise direction.

(10) Since the holding member 35 is provided separately from the lever member 31, the holding member 35 and the lever member 31 are arranged on both sides of the seat cushion frame 11. Thus, space is easily saved and the device is easily unitized.

The present embodiment may be modified as follows.

The engaging piece 41b and the restricting piece 11b associated with restricting the rotation of the holding bracket 41 may be omitted.

The holding member 35 may be formed integrally with the seat cushion frame 11.

The holding member 35 (the guide surface 35a) for maintaining the mesh between the plate member 40 and the memory pawl 42 may be provided on the lever member 31 if there is no space restriction or an adverse effect on the operation.

The hinge 26b of the control shaft 26 may be loosely fitted in the fitting bore formed in the proximal end of the unlock operation lever 27. In this case, since the clearances formed in the fitting bore of the unlock operation lever 27 permits relative rotation of the hinge 26b in the rotation direction (the clockwise direction in FIG. 4) of the hinge 26b (the control shaft 26) associated with the operation of the memory operation lever (rotation of the lever member 31), the unlock operation lever 27 is prevented from being rotated in conjunction with the operation of the memory operation lever (rotation of the control shaft 26).

Appropriate curved surfaces or flat surfaces may be employed as the first and second surfaces instead of the first and second arcuate portions 42b, 42c.

A wall portion that guides the guide portion 37 may be employed as the first and second extended portions instead of the first and second slots 38a, 38b.

The memory pawl 42 may be urged in the direction to mesh with the plate member 40. In this case, the memory pawl 42 is inhibited from meshing with the plate member 40 by, for example, applying prevention force by a stopper function such as a pin provided on the memory operation lever. The memory pawl 42 meshes with the plate member 40 by cancelling the stopper function (cancelling the prevention force) by operating the memory operation lever. Alternatively, a guide hole may be provided in the memory pawl 42, and a pin that is guided by the guide hole may be provided on the lever member 31. In this case, the mesh and mesh cancelling of the memory pawl 42 is changed by the rotation of the lever member 31 without applying urging force to the memory pawl 42.

The plate member 40 may be omitted and the engaging portion (the meshing portion 40a) may be formed integrally with the upper plate 22.

The plate member 40 and the memory pawl 42 may be engaged by, for example, frictional engagement using friction material provided instead of the meshing portion.

In the present embodiment, the case in which the seat back frame 12 (the seat back) is inclined forward to the final inclination position is described. However, the seat back frame 12 (the seat back) may be inclined rearward to the final inclination position.

The unlock operation lever 27 itself may not be firmly secured to the hinge 26b but may be fitted in the hinge 26b with clearances, and the unlock operation lever 27 may be secured by sandwiching the unlock operation lever 27 with other components.

The rotational center of the lever member 31 does not need to be coaxial with the control shaft 26.

The holding bracket 41 may be supported by a step portion provided on the lower plate 21.

The lever member 31 may be formed integrally with the memory operation lever.

In the present embodiment, the clearances 46a are provided in the fitting bore 46 of the lever member 31 associated with the memory function. Thus, the memory operation lever does not operate in conjunction with the normal reclining operation (unlocking the lock mechanism 20) performed by the unlock operation lever 27. In contrast, in the case in which the walk-in function linked with the unlock operation lever 27 and the operation lever associated with an accommodation function of the vehicle seat are provided, it may be configured such that the operation lever does not operate in conjunction with the normal reclining operation by the unlock operation lever 27 in the same manner. Also, it may be configured that the unlock operation lever 27 does not operate in conjunction with a predetermined operation of the operation lever. In either case, the compatibility of the seat in which the functions (the memory function, the walk-in function, and the accommodation function) are provided and the seat in which the functions are omitted is improved.

DESCRIPTION OF REFERENCE CODES

1 . . . vehicle seat, 11 . . . seat cushion frame, 11b . . . engaging piece (restricting portion), 12 . . . seat back frame, 20 . . . lock mechanism, 21 . . . lower plate (base body), 22 . . . upper plate (rotating body), 22c . . . step portion, 26 . . . control shaft, 26b, 26c . . . hinges, 27 . . . unlock operation lever, 30 . . . memory mechanism, 31 . . . lever member, 33 . . . arm member, 34 . . . cam member (restricting portion), 35 . . . holding member (engagement holding portion), 36 . . . guide pin (abutment portion), 37 . . . guide portion, 38 . . . slots, 38a . . . first slot (first extended portion), 38b . . . second slot (second extended portion), 38c . . . depression part, 40 . . . plate member (plate portion), 40a . . . meshing portion (engaging portion), 41 . . . holding bracket, 42 . . . memory pawl, 42b . . . first arcuate portion (first surface), 42c . . . second arcuate portion (second surface), 42d . . . step, 46 . . . fitting bore, 46a . . . clearances (interlock inhibiting portion).

The invention claimed is:

1. A seat reclining device for a vehicle, comprising:
a lock mechanism arranged between a seat cushion frame and a seat back frame, the lock mechanism being selectively shifted between a locked state, in which the inclination of the seat back frame with respect to the seat cushion frame is restricted, and an unlocked state, in which the inclination is permitted, by rotation of a control shaft in accordance with operation of an unlock operation lever, the lock mechanism including a base body, which is secured to the seat cushion frame, and a rotating body, which is secured to the seat back frame and is supported to be freely rotatable with respect to the base body, the control shaft and the rotating body being rotated about the same rotational axis; and
a memory mechanism, wherein, when a memory operation lever is operated, the memory mechanism stores an angular position of the seat back frame with respect to the seat cushion frame in the state in which the lock mechanism is in the locked state, and the memory mechanism shifts the lock mechanism to the unlocked state so as to permit the seat back frame to be inclined to a predetermined inclination position,
wherein the memory mechanism includes:
a plate portion located on the rotating body, the plate portion including an engaging portion,
a holding bracket arranged closer to the seat cushion frame than a coupling surface between the seat back frame and the rotating body in a seat widthwise direction, and the holding bracket being freely rotatable about the rotational axis that is the same as that of the control shaft,
a memory pawl, which is coupled to the holding bracket to be freely rotatable, the memory pawl being selectively engaged with the engaging portion of the plate portion while receiving a prevention force preventing engagement with the engaging portion;
a restricting portion, which restores the holding bracket to a predetermined initial position by restricting the holding bracket from rotating in a reverse direction to the direction in which the seat back frame is inclined to the predetermined inclination position;

a lever member, which engages the memory pawl with the plate portion against the prevention force applied to the memory pawl or by cancelling the prevention force, the lever member being rotated in accordance with operation of the memory operation lever such that, as the control shaft is rotated in conjunction with the lever member, the lock mechanism is shifted to the unlocked state and the unlocked state is maintained; and an engagement holding portion, wherein, when the holding bracket is rotated to incline the seat back frame to the predetermined inclination position, the engagement holding portion maintains engagement between the memory pawl and the plate portion, and the engagement holding portion selectively disengages the memory pawl from the plate portion as the holding bracket is restored to the initial position.

2. The seat reclining device according to claim 1, wherein the holding bracket is supported by a step portion formed on the base body or the rotating body.

3. The seat reclining device according to claim 1, wherein:

when the lever member is rotated in accordance with operation of the memory operation lever, the lever member abuts against the memory pawl, thereby engaging the memory pawl with the plate portion against the prevention force applied to the memory pawl or by cancelling the prevention force;

the memory pawl includes a first surface the radial distance of which from the rotational axis of the control shaft is small, a second surface the radial distance of which from the rotational axis of the control shaft is greater than that of the first surface, and a step portion arranged between the first surface and the second surface; and the lever member includes an abutment portion, which selectively abuts against the first surface, the second surface, and the step portion, and, when the abutment portion moves from the first surface to the second surface or from the second surface to the first surface via the step portion in accordance with rotation of the lever member, the memory pawl is shifted between the state in which the memory pawl is engaged with the plate portion and the state in which the memory pawl is disengaged from the plate portion.

4. The seat reclining device according to claim 1, wherein:

the lever member includes a first extended portion, which extends along the circumferential direction about the rotational axis of the control shaft, and a second extended portion, which extends continuously from the first extended portion toward the control shaft; and the memory mechanism includes an arm member, which is rotatably coupled to the seat cushion frame, the arm member including a guide portion, which is inserted in the first and second extended portions, the arm member permits rotation of the lever member when the guide portion is arranged in the first extended portion, and restricts rotation of the lever member when the guide portion enters the second extended portion.

5. The seat reclining device according to claim 4, wherein:

the restricting portion includes a cam member, which is coupled to the arm member to rotate integrally with the arm member, and the cam member being selectively engaged with the holding bracket as the holding bracket is restored to the initial position; and after the memory pawl is engaged with the plate portion, the arm member is rotated while moving the guide portion to the second extended portion so that the cam member is disengaged from the holding bracket.

6. The seat reclining device according to claim 1, wherein:

the engagement holding portion is provided on the seat cushion frame; and the abutment portion of the lever member maintains the engagement between the memory pawl and the plate portion at the beginning of rotation of the holding bracket to the predetermined inclination position, and subsequently, the engagement holding portion maintains engagement between the memory pawl and the plate portion.

7. The seat reclining device according to claim 1, wherein the lever member includes an interlock inhibiting portion, which inhibits the lever member from interlocking with the control shaft when the control shaft is rotated in accordance with operation of the unlock operation lever.

8. The seat reclining device according to claim 7, wherein:

the control shaft includes a first hinge on one end and a second hinge on the other end;

the first hinge is coupled to the unlock operation lever;

the second hinge is fitted to a fitting bore of the lever member; and the interlock inhibiting portion is a clearance in the fitting bore set in the direction of rotation of the control shaft associated with operation of the unlock operation lever.

9. The seat reclining device according to claim 4, wherein the second extended portion includes a depression part, which is depressed by the guide portion in accordance with rotation of the arm member, and the depression part is depressed by the guide portion such that the control shaft, which is interlocked with the lever member, is rotated to shift the lock mechanism to the unlocked state.

* * * * *